(12) United States Patent
Jeffries et al.

(10) Patent No.: US 7,673,142 B2
(45) Date of Patent: *Mar. 2, 2010

(54) EFFICIENT METHOD FOR PROVIDING SECURE REMOTE ACCESS

(75) Inventors: Clark Debs Jeffries, Durham, NC (US); Mohammad Peyravian, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 82 days.

This patent is subject to a terminal disclaimer.

(21) Appl. No.: 12/126,518

(22) Filed: May 23, 2008

(65) Prior Publication Data
US 2008/0229105 A1    Sep. 18, 2008

Related U.S. Application Data

(63) Continuation of application No. 10/733,713, filed on Dec. 11, 2003, now Pat. No. 7,434,050.

(51) Int. Cl.
*H04L 9/30* (2006.01)
(52) U.S. Cl. .................. 713/169; 380/30; 713/171
(58) Field of Classification Search .................. 713/169
See application file for complete search history.

(56) References Cited

U.S. PATENT DOCUMENTS 6,718,467 B1    4/2004   Trostle
6,792,533 B2    9/2004   Jablon
6,826,686 B1    11/2004  Peyravian et al.

OTHER PUBLICATIONS www.atis.org, definition of Message Authentication Code.
www.ibm.com, definition of nonce.
www.searchsecurity.com, definition of one-time pad.
Peyravian et al., "Methods for Protecting Password Transmission", Published in Computers and Security,vol. 19, No. 5, pp. 466-469, 2000.
"Secure Hash Standard", NIST FIPS PUB 180-2, Aug. 2002.
Diffie et al., "New Directions in Cryptography", IEEE Transactions on Information Theory, vol. IT-22, No. 6, pp. 644-654, 1976.

*Primary Examiner*—Edan Orgad
*Assistant Examiner*—Harris C Wang
(74) *Attorney, Agent, or Firm*—John R. Pivnichny; Duke W. Yee (57) ABSTRACT

A remote user, two-way authentication and password change protocol that also allows parties to optionally establish a session key which can be used to protect subsequent communication. In a preferred embodiment, a challenge token is generated and exchanged which is a one-time value that includes a random value that changes from session to session. The construction and use of the challenge token avoids transmission of the password or even the transmission of a digest of the password itself. Thus the challenge token does not reveal any information about a secret password or a digest of the password.

2 Claims, 5 Drawing Sheets

| COMMUNICATING ENTITIES (402,404,406) | INFORMATION SENT (408) |
|---|---|
| 402 USER => CLIENT 404 | id, pw |
| 406 CLIENT => SERVER | id, rc, p, g, $g^x$ |
| CLIENT <= SERVER | CHALLENGE, $g^y$ |
| CLIENT => SERVER | id, r s |
| CLIENT <= SERVER | ser_auth_token, ACCESS GRANTED (OR DENIED) |

| COMMUNICATING ENTITIES (402,404,406) | INFORMATION SENT (408) |
|---|---|
| 402 — USER => CLIENT — 404 | id, pw |
| 406 — CLIENT => SERVER | id, rc, p, g, $g^x$ |
| CLIENT <= SERVER | CHALLENGE, $g^y$ |
| CLIENT => SERVER | id, r s |
| CLIENT <= SERVER | ser_auth_token, ACCESS GRANTED (OR DENIED) |

*FIG. 4*

| COMMUNICATING ENTITIES (602,604,606) | INFORMATION SENT (608) |
|---|---|
| 602 — USER => CLIENT — 604 | id, pw, new_pw |
| CLIENT => SERVER — 606 | id, rc, p, g, $g^x$ |
| CLIENT <= SERVER | CHALLENGE, $g^y$ |
| CLIENT => SERVER | id, r s |
| CLIENT <= SERVER | ser_auth_token |
| CLIENT => SERVER | id, masked_idpw_digest_new, MAC |
| CLIENT <= SERVER | PASSWORD CHANGE ACCEPTED (OR REJECTED), CODE |

EFFICIENT METHOD FOR PROVIDING SECURE REMOTE ACCESS

This application is a continuation of application Ser. No. 10/733,713, filed Dec. 11, 2003, status allowed.

BACKGROUND OF THE INVENTION

1. Technical Field

The present invention relates generally to the field of digital communications, and more particularly to secure communication of passwords and other sensitive information across a network connection.

2. Description of Related Art

In a networked computer environment, users often interact with local application programs that exchange data with remote application programs on behalf of the user. When the remote application program controls resources of value, it is often the case that a user must gain access to the information through the use of a user name (or "userid") and password used for verification and access control. Userids are considered, in most cases, to be public information, but passwords are for obvious reasons considered private, and attempts are made to keep them secret. To access remote information, a local application typically sends the userid and password combination to the remote application across a network.

Servers are often used in networks to control access to applications and other resources residing within the network. In such cases, servers manage the resources and data for which they are responsible and facilitate access to the resources and data by networked machines which log onto the network by way of the proper credentials.

It is also common for one or more network servers to be responsible for administering and limiting network access to clients for which valid account credentials have been provided during a network logon procedure. In this respect, the network server maintains a security database including account identification corresponding to users and services authorized to access the network and the protected network resources for which the network server enforces limited access.

For remote user authentication, some applications such as telnet and ftp send user credentials (i.e., userid and password) over public networks in the clear (i.e., unprotected). Generally, applications such as telnet and ftp that transmit this information are not considered secure if they transmit the information across untrusted networks. When the network is untrusted, the user's passwords are susceptible to exposure and monitoring by unauthorized parties if the information is sent in the clear. Such outside parties could then replay the information at some time in the future and gain access to the presumably protected resources.

Typical user authentication protocols for protecting passwords while traveling over public networks encrypt passwords with symmetric-key cryptosystems (such as DES, AES, RC5, etc.) or public-key cryptosystems (such as RSA, DSA, etc.). Encrypting passwords this way imposes additional overhead on the local and remote applications. Under such schemes, the sender and receiver of the password messages know the operative encryption and decryption schemes before communication. Often, the sender encrypts the message by applying an encryption scheme using a key. The receiver decrypts the message by using a corresponding decryption scheme and the corresponding key known by the receiver.

Some user authentication protocols use collision-resistant one-way hash functions to protect the secrecy of passwords when they are transmitted over public networks. Hash functions take an input string and apply a function to the input string to produce a hash value (or simply hash), also called a message digest. The hash or digest is substantially smaller than the text itself, and is generated by a formula in such a way that it is extremely unlikely that some other text will produce the same hash value. In fact, an ideal hash function has the property that reversing exactly one bit at a time in the input string causes seemingly random changes in all the bits in output hash. The only way to attempt to get a given pattern as the hash value is to repeatedly try random input strings. If the hash value has 128 bits, then trying input strings with no possible systematic search mechanism would clearly be computationally impossible. For one-way hashes, it is also very unlikely that a listener on a public network will be able to reproduce the original input string from the digest.

Hashes play a role in security systems where they're used to ensure that transmitted messages have not been tampered with. The sender generates a hash of the message, encrypts it, and sends it with the message itself. The recipient then decrypts both the message and the hash, produces another hash from the received message, and compares the two hashes. If they're the same, there is a very high probability that the message was transmitted intact. Thus, the integrity of the message can be strongly indicated using hash functions.

Hash functions are well suited for applications in which the receiving party does not need to know the input string corresponding to the output string in a received message. In this instance, the user's password is not sent across the network, only the hash of the password (in combination with some other values) is sent. Methods of using hash functions were not shown to be effective for password change until schemes to accomplish this were presented in "*Method for Protecting Password Transmission,*" Computers and Security, Vol. 19, No. 5, pages 466-469, 2000 (Peyravian, M. Zunic, N.), which is hereby incorporated by reference. These schemes do not use any symmetric-key or public-key cryptosystems. They only employ a collision-resistant hash function such as SHA. See, for example, "*Secure Hash Standard,*" FIPS PUB 180-2, August, 2002, National Institute of Standards Technology, which is hereby incorporated by reference. These schemes, however, do not provide protection against the offline password-guessing attack (i.e., dictionary attack) and denial of service attack. The offline password-guessing attack is an issue if users choose weak passwords, such as variations of common names.

Therefore, the present state of the art would benefit from a method of secure remote access that protects against dictionary and denial of service attacks while avoiding the need for public-key or symmetric-key cryptosystems.

SUMMARY OF THE INVENTION

The present invention describes, in an example embodiment, a remote user authentication and password change protocol that also allows parties to optionally establish a session key which can be used to protect subsequent communication using hash functions. In an example embodiment, the client requests access to the server by sending a set of values which prompt the server to respond with a one-time challenge token that depends on a random value. The client retrieves the random value of the challenge token and sends it back to the server. The server verifies that the received random value is correct, which prompts the server to generate a one-time authentication token, granting permission to the client to access the server.

In another embodiment, the scheme is used to safely change a client's password. In this embodiment, authentication preferably proceeds as described above, with the addition of the client submitting a new password digest to the server by creating a message authentication code and a masked version of the new password digest. The masked digest and message authentication code are sent to the server, which computes the mask and the new password digest to generate the message authentication code, which it compares with the transmitted message authentication code. If the message authentication code is verified, password change is accepted.

Other features and advantages are described more fully in the description below.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention is herein described with reference to a client and server in a network environment. The following discussion is intended as an example implementation, and is not intended to imply limitations on the present invention, which is described by the claims.

Figure 1:
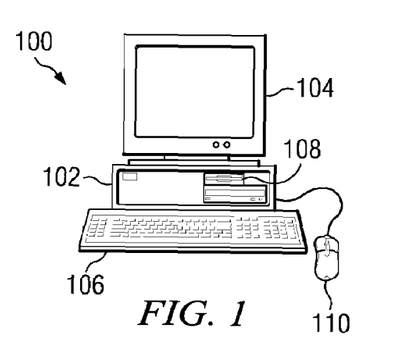
FIG. 1 shows a computer system consistent with implementing a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 102, a video display terminal 104, a keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
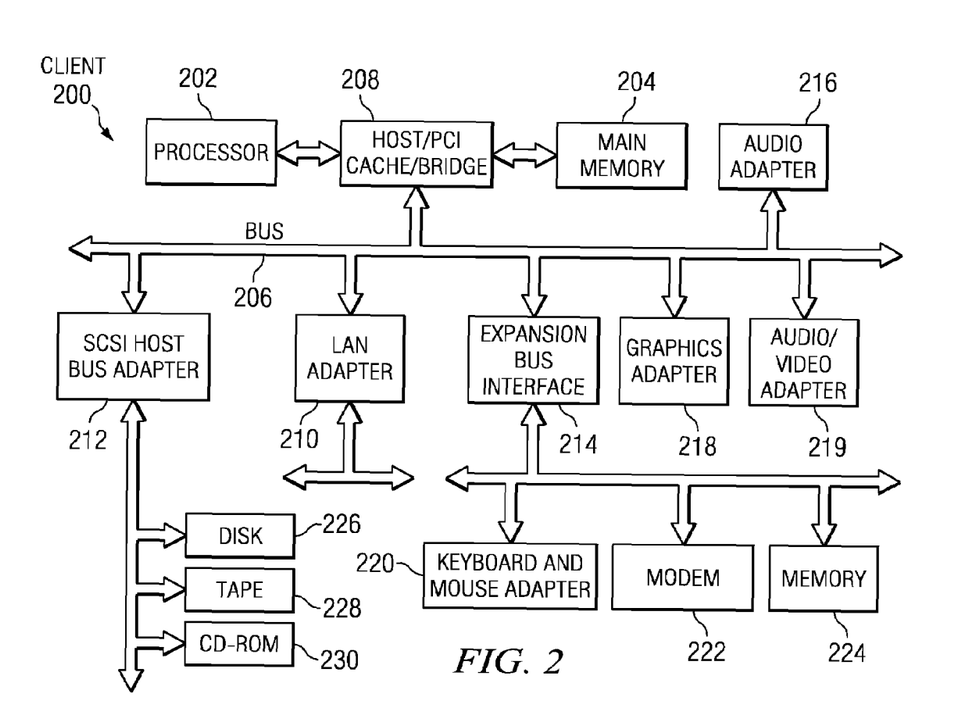
FIG. 2 shows a block diagram of computer system components consistent with implementing a preferred embodiment of the present invention.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

Figure 3:
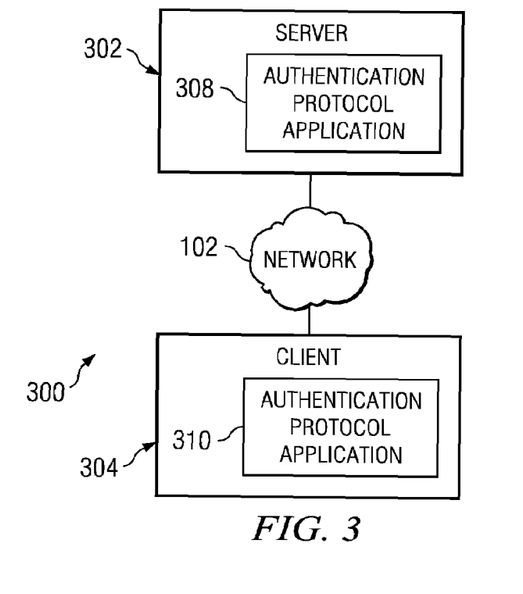
FIG. 3 shows a network consistent with use in a preferred embodiment of the present invention.

FIG. 3 shows a network environment, including a network data processing system 300. In this example, a server system 302 communicates with a client system 304 through a network connection 102, such as the Internet or other communications medium, including wireless communication. In this application, the term "client" will refer to the local application program acting on behalf of the user on the client system 304. The term "server" refers to the remote application program of the server system 302 with which the client interacts. Server 302 preferably includes an application capable of performing authentication communication and services, such as Authentication Protocol Application 308. Likewise, client 304 preferably includes an application capable of performing authentication communication and services, such as Authentication Protocol Application 310.

The present invention describes protocols for remote user authentication and password change that also allows the parties to optionally establish a session key which can be used to protect their subsequent communications. The protocols employ the Diffie-hellman (DH) key agreement scheme, for example as described in "*New Directions in Cryptography,*" IEEE Transactions on Information Theory, Vol. IT-22, No. 6, pages 644-654, 1976, which is hereby incorporated by reference in its entirety, which is hereby incorporated by reference. Additionally, a collision-resistant one-way hash function is used, such as SHA. In the present invention's protocols, the DH key agreement scheme is used by the client and server to establish a shared secret to protect exchanges. In a preferred embodiment, the client and sever are not required to have static or established DH ephemerals, as may be required in some schemes.

For access to the resources at the server, we assume that the user has a "userid" denoted by "id" and a "password" denoted by "pw". The password is considered to be a secret value that only the user and the server know. The userid is known to both the user and the server and unlike the password is not meant to be kept secret. There can be any number of users but each user preferably has a unique id.

In the protocols of the present invention, the server does not store the password, instead it stores a password digest value referred to as the idpw_digest, where idpw_digest=Hash(id, pw). The "Hash" function is preferably chosen from any strong collision-resistant one-way hash functions.

The protocol for remote user authentication performs mutual authentication. A preferred embodiment is described with reference to FIG. 4 in table 400. The user 402 first submits an id and pw to the client 404. The client 404 then generates a random value rc (shown among "information sent" 408). Additionally, the client 404 chooses a large prime p and a primitive root g for GF(p), where GF(p) is the set of integers $\{0, 1, \ldots, p-1\}$ with arithmetic operations defined modulo p. (Note that the powers of g generate all the integers from 1 through p−1 of GF(p).) The client 404 also chooses a large random integer x, where x<p−1, computes $g^x$ and sends id, rc, p, g, and $g^x$ to the server. Note that $g^x$ is computed over GF(p) which means $g^x \bmod p$.

Figure 4:
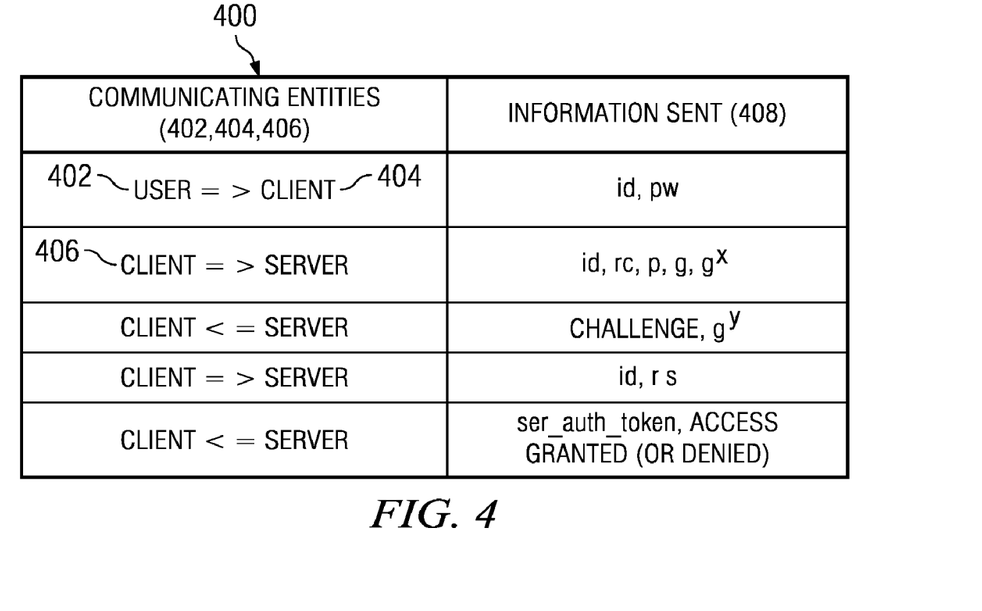
FIG. 4 shows a table depicting the communications and information between entities of a preferred embodiment of the present invention.

In a preferred embodiment, the server 406 generates a random value rs. It also chooses a large random integer y, where y<p−1, and computes $g^y$ over GF(p). Then it computes $g^{xy}$ over GF(p) by taking the received $g^x$ and raising it to y. Next, the server 406 generates a one-time "challenge" token using $g^{xy}$, idpw_digest, rc, and rs. The challenge taken is generated as follows: challenge=rs⊕Hash($g^{xy}$, idpw_digest, rc), i.e., an exclusive or (XOR) operation with rs and the hash as shown. Note that as before, the server stores idpw_digest instead of the password pw itself. the challenge token is a one-time value since it includes random values that change for each session. This ensures freshness of the communication and prevents against replay attacks. Moreover, because of the random value of rs, and the one way hash function, the challenge token does not reveal any information about the secret password or its digest. The server 406 then sends the challenge token and $g^y$ to the client 404. The client first computes the idpw_digest using the id and the pw received from the user. Next, the client retrieves rs by computing Hash($g^{xy}$, idpw_digest, rc) using its local values and exclusive-oring it with the received challenge token. The client then sends id and rs to the server. (Note that the inclusion of the id in this example flow helps the server locate the session context since it may have multiple concurrent active session contexts with different clients.)

The server verifies that the received rs is the same as the one it generated. If they are the same, the user is authenticated and the server generates a one-time authentication token. The server's authentication token is a hash of $g^{xy}$, idpw_digest, rc, and rs. The server then sends its authentication token to the client.

The client verifies the validity of the received authentication token from the server by independently computing the server's authentication token and comparing it with the one received. If the server's authentication token is valid, the server is authenticated.

Figure 5:
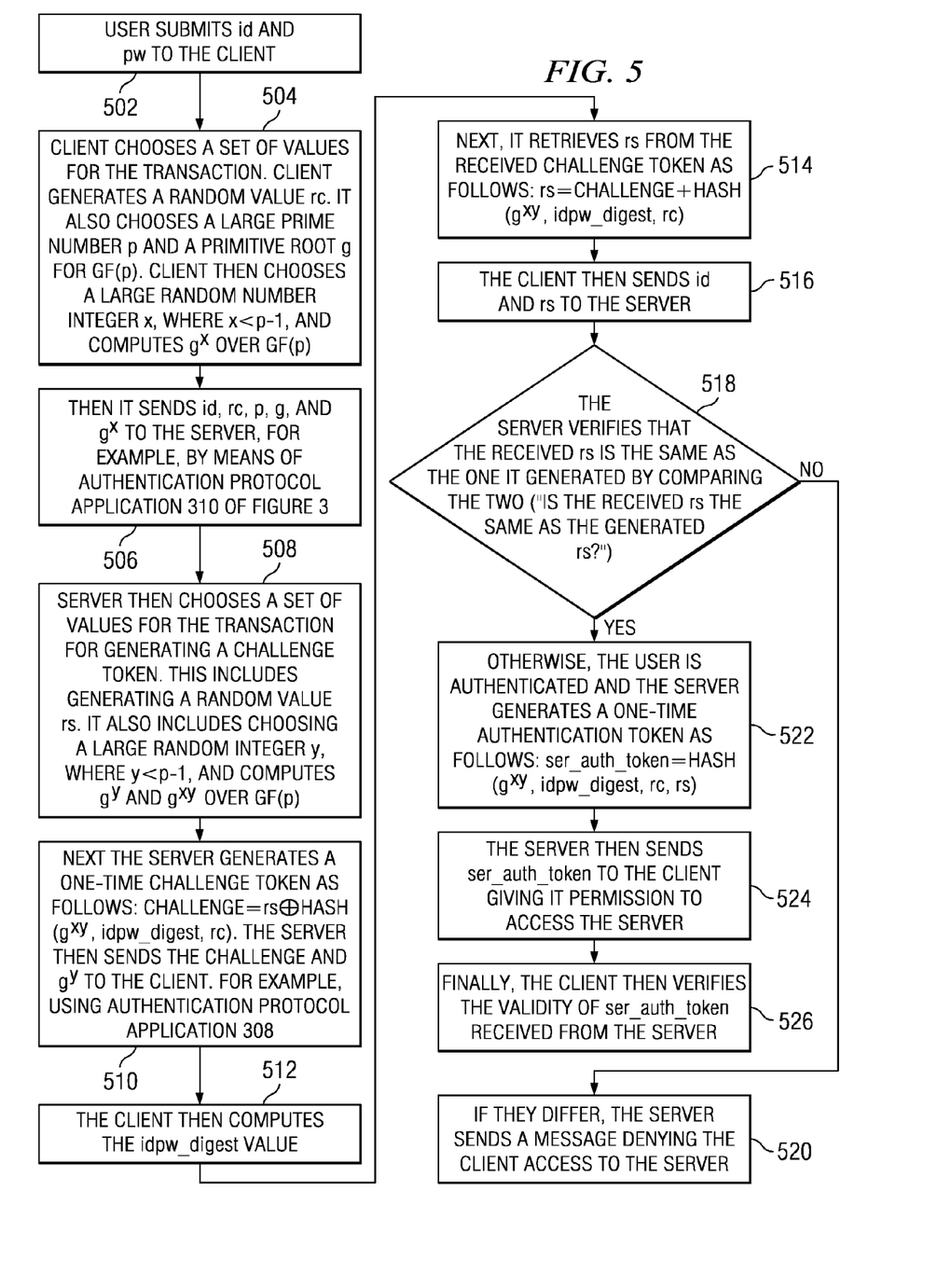
FIG. 5 shows a flowchart of process steps for implementing a preferred embodiment of the present invention.

FIG. 5 shows process steps for implementing a preferred embodiment of the present invention. First, the user submits id and pw to the client (step 502). Next, the client chooses a set of values for the transaction (step 504). These choices include the following actions: the client generates a random value rc. It also chooses a large prime number p and a primitive root g for GF(p). Client then chooses a large random number integer x, where x<p−1, and computes $g^x$ over GF(p). Then it sends id, rc, p, g, and $g^x$ to the server (step 506), for example, by means of Authentication Protocol Application 310 of FIG. 3. The server then chooses a set of values for the transaction for generating a challenge token, as follows (step 508). This includes generating a random value rs. It also includes choosing a large random integer y, where y<p−1, and computes $g^y$ and $g^{xy}$ over GF(p). Next, the server generates a one-time challenge token as follows: challenge=rs⊕hash($g^{xy}$, idpw_digest, rc). The server then sends the challenge and $g^y$ to the client (step 510), for example, using Authentication Protocol Application 308. The client then computes the idpw_digest value (step 512). Next, it retrieves rs from the received challenge token as follows: rs=challenge⊕hash($g^{xy}$, idpw_digest, rc) (step 514). The client then sends id and rs to the server (step 516). The server verifies that the received rs is the same as the one it generated by comparing the two ("Is the received rs the same as the generated rs?") (step 518). If they differ ("no"), the server sends a message denying the client access to the server (step 520). Otherwise ("yes"), the user is authenticated and the server generates a one-time authentication token as follows: ser_auth_token=hash($g^{xy}$, idpw_digest, rc, rs) (step 522). The server then sends ser_auth_token to the client giving it permission to access the server (step 524). Finally, the client then verifies the validity of ser_auth_token received from the server, and if the token is valid, the server is authenticated as well (step 526).

It might be desired for the client and server to establish a symmetric session key which can be used to protect (e.g., encrypt) further information transmitted in the session after the initial authentication. If this is desired, after step 510 above, the client and server can generate a one-time session key using $g^{xy}$, idpw_digest, rc, and rs in several. For example, the session key can be a hash of $g^{xy}$, idpw_digest, rc, and rs plus some fixed value. That is, session_key=Hash($g^{xy}$, idpw_digest, rc, rs+1). The fixed value added to rs makes the session key different from the server's authentication token.

Figure 6:
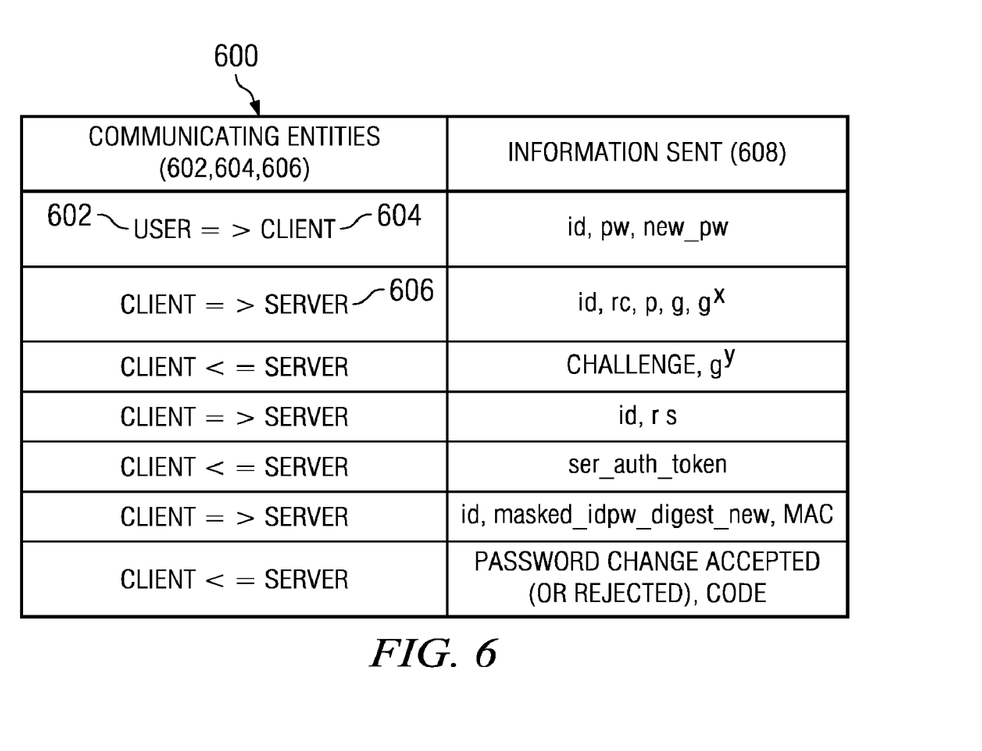
FIG. 6 shows a table depicting the communications and information between entities of a preferred embodiment of the present invention.

In another embodiment of the present invention, the protocol for password change performs mutual authentication and user password update and works as follows. Referring to FIG. 6 in table 600, the user 602 first submits an id, pw, and new_pw to the client 604. The client 604 generates a random value rc (shown among "information sent" 608). Additionally, client 604 chooses a large prime p and a primitive root g for GF(p). The client 604 also chooses a large random integer x, where x<p−1, computes $g^x$, and sends id, rc, p, g, and $g^x$ to the server 606, for example, using Authentication Protocol Application 310 of FIG. 3. The server 606 generates a random value rs. It also chooses a large random integer y, where y<p−1, and computes $g^y$ and $g^{xy}$. Next, the server 606 generates a one-time challenge token using $g^{xy}$, idpw_digest, rc, and rs. The challenge token is generated as follows: challenge=rs⊕Hash($g^{xy}$, idpw_digest, rc). Server 606 then sends the challenge token and $g^y$ to client 604, for example, using Authentication Protocol Application 308 of FIG. 3.

The client first computes the idpw_digest using the id and pw received from the user. Next, the client retrieves rs by computing Hash($g^{xy}$, idpw_digest, rc) using its local values and exclusive-oring it with the received challenge token. The client then sends id and rs to the server. The server verifies that the received rs is the same as the one it generated. If they are the same, the user is authenticated and the server generates a one-time authentication token. The server's authentication token is a hash of $g^{xy}$, idpw_digest, rc, and rs. The server then sends its authentication token to the client.

The client verifies the validity of the received authentication token from the server by independently computing the server's authentication token and comparing it with the one received. If the server's authentication token is valid, the server is authenticated. If the server is authenticated, the client then generates the new password digest value idpw_digest_new and a one-time mask value. The mask is used to cover the idpw_digest_new values before sending it to the server and is generated by computing a hash over $g^{xy}$, rc, and rs. Next, the client covers the idpw_digest_new value by exclusive-oring it with the mask value. This exclusive-ored result is denoted by masked_idpw_digest_new. The client also generates a message authentication code (mac) by computing a hash over $g^{xy}$, idpw_digest_new, rc, and rs. The mac is used to protect idpw_digest_new against tampering. the client then sends id, masked_idpw_digest_new, and mac to the server.

The server first generates the mask using its local copies of $g^{xy}$, rc, and rs. It then retrieves idpw_digest_new by exclusive-oring the mask with the received masked_idpw_digest_new. next, it verifies the validity of the received mac by independently computing it using the retrieved idpw_digest_new and its local copies of $g^{xy}$, rc, and rs. If the mac is valid, the server replaces idpw_digest with idpw_digest_new and sends a message to the client accepting the password change.

Figure 7A:
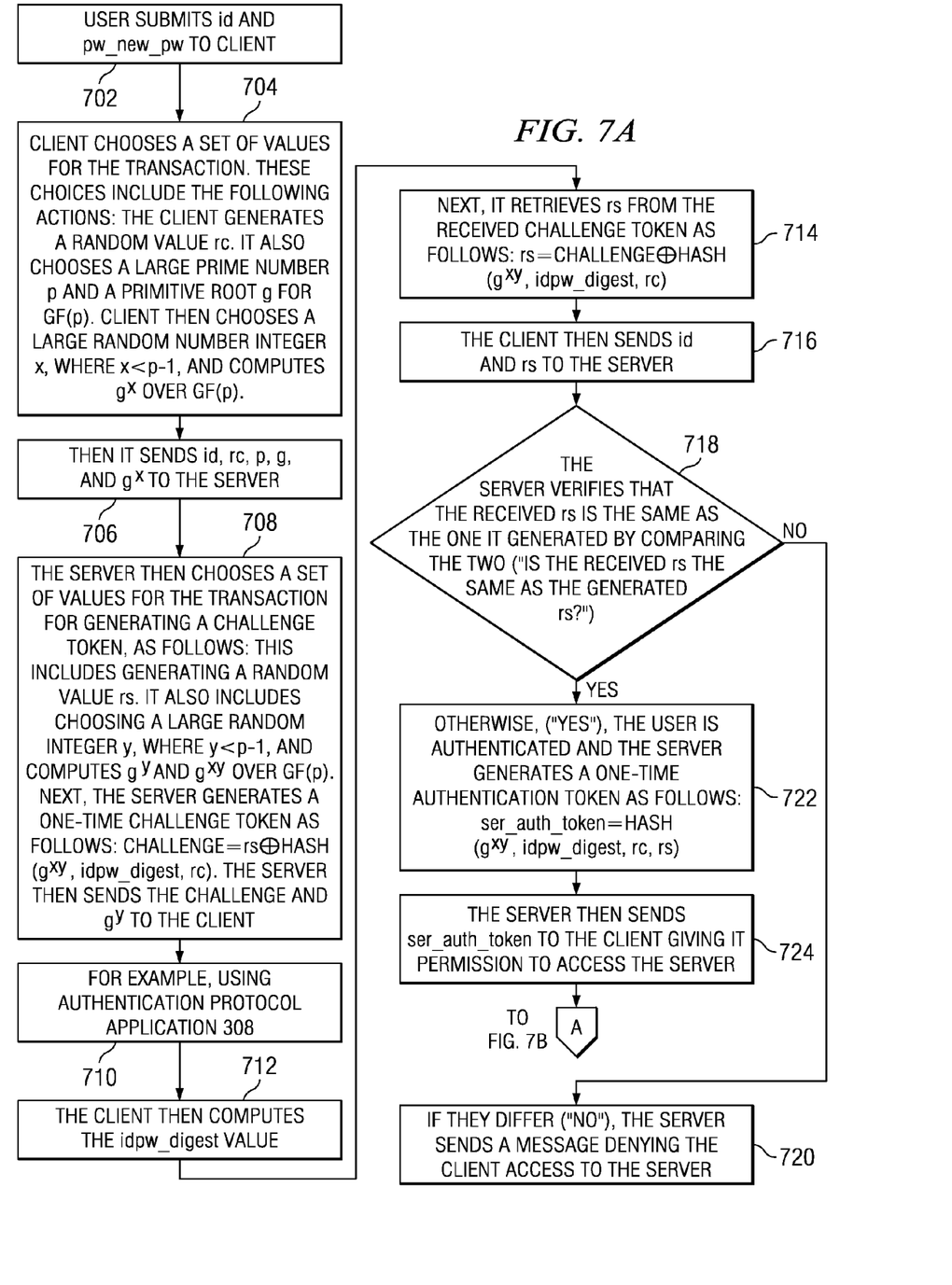
FIGS. 7A-7B show a flowchart of process steps for implementing a preferred embodiment of the present invention.
Figure 7B:
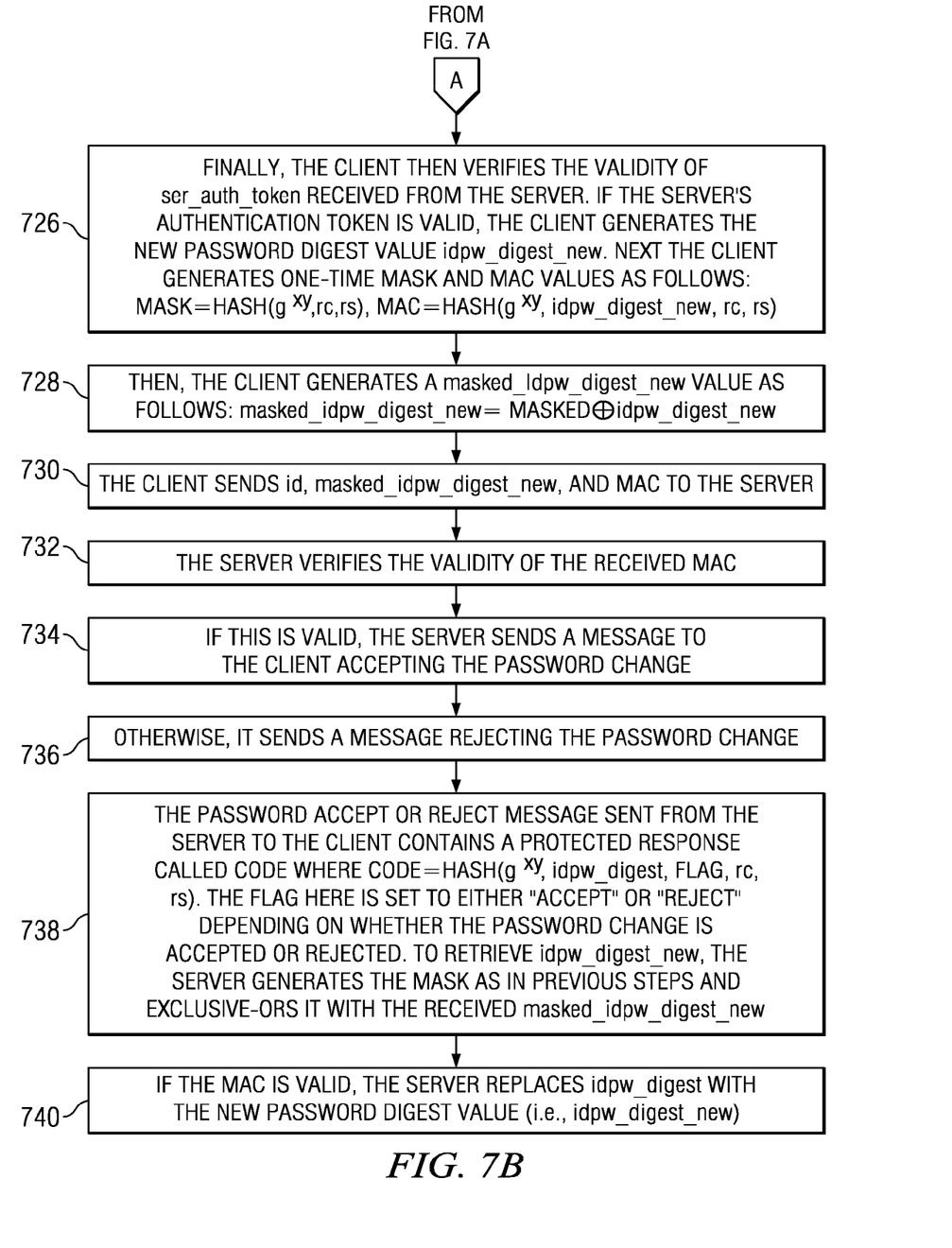

FIG. 7 depicts process steps for implementing the password change protocol in an example preferred embodiment. First, the user submits id and pw to the client (step 702). Next, the client chooses a set of values for the transaction (step 704). These choices include the following actions: the client generates a random value rc. It also chooses a large prime number p and a primitive root g for GF(p). Client then chooses a large random number integer x, where x<p−1, and computes $g^x$ over GF(p). Then it sends id, rc, p, g, and $g^x$ to the server (step 706), for example, by means of Authentication Protocol Application 310 of FIG. 3. The server then chooses a set of values for the transaction for generating a challenge token, as follows (step 708). This includes generating a random value rs. It also includes choosing a large random integer y, where y<p−1, and computes $g^y$ and $g^{xy}$ over GF(p). Next, the server generates a one-time challenge token as follows: challenge=rs⊕hash($g^{xy}$, idpw_digest, rc). The server then sends the challenge and $g^y$ to the client (step 710), for example, using Authentication Protocol Application 308. The client then computes the idpw_digest value (step 712). Next, it retrieves rs from the received challenge token as follows: rs=challenge⊕hash($g^{xy}$, idpw_digest, rc) (step 714). The client then sends id and rs to the server (step 716). The server verifies that the received rs is the same as the one it generated by comparing the two ("Is the received rs the same as the generated rs?") (step 718). If they differ ("no"), the server sends a message denying the client access to the server (step 720). Otherwise ("yes"), the user is authenticated and the server generates a one-time authentication token as follows: ser_auth_token=hash($g^{xy}$, idpw_digest, rc, rs) (step 722). The server then sends ser_auth_token to the client giving it permission to access the server (step 724). Finally, the client then verifies the validity of ser_auth_token received from the server. If the server's authentication token is valid, the client generates the new password digest value idpw_digest_new. Next, the client generates one-time mask and mac values as follows: mask=Hash($g^{xy}$, rc, rs), mac=Hash($g^{xy}$, idpw_digest_new, rc, rs) (step 726). Then, the client generates a masked_idpw_digest_new value as follows: masked_idpw_digest_new=mask⊕idpw_digest_new (step 728). The client sends id, masked_idpw_digest_new, and mac to the server (step 730).

The server verifies the validity of the received mac (step 732). If it is valid, the server sends a message to the client accepting the password change (step 734). Otherwise, it sends a message rejecting the password change (step 736). The password accept or reject message sent from the server to the client contains a protected response called code where code=Hash($g^{xy}$, idpw_digest, flag, rc, rs). The flag here is set to either "accept" or "reject" depending on whether the password change is accepted or rejected. To retrieve idpw_digest_new, the server generates the mask as in previous steps and exclusive-ors it with the received masked_idpw_digest_new (step 738). If the mac is valid, the server replaces idpw_digest with the new password digest value (i.e., idpw_digest_new) (step 740). The server verifies the validity of the received mac value by independently computing it using the retrieved idpw_digest_new and its local copies of $g^{xy}$, rc, and rs.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer network, comprising:
    a client and a server connected by a network connection, wherein the client has a userid and a password associated with the client;
    wherein the client requests access to the server by sending a first set of values to the server, wherein the first set of values includes a client-generated random value, a large prime number, a primitive root of the large prime number, and the primitive root raised to a power of a large random integer less than the large prime number minus one;
    wherein the server responds to the client by generating a one-time challenge token that depends at least on a server-generated random value and sending the challenge token to the client, wherein the server generates the challenge token by exclusive-oring the server-generated random value with a first hash, and wherein the first hash is a hash of the primitive root of the large prime number raised to a power, a digest of the client's userid and password, and the client-generated random value;
    wherein the client retrieves the server-generated random value from the challenge token and sends the server-generated random value and the userid to the server;
    wherein the server verifies the received server-generated random value from the client is correct by comparing the server-generated random value received from the client with the server's stored value of the server-generated random number, and if so, the server generates a one-time authentication token and sends it to the client, giving it permission to access the server;
    wherein the client verifies the validity of the one-time authentication token received from the server;
    wherein if the client verifies that the one-time authentication token from the server is valid, the client changes the password by computing a hash of the userid and a new password to form a new digest, creating a mask, computing a message authentication code, and by exclusive-oring the mask with the new digest to form a result, and sending the result, the userid, and the message authentication code to the server;
    wherein the server retrieves the new digest by exclusive-oring the mask with the received result, and wherein the server verifies the received message authentication code; and
    wherein if the received message authentication code is verified, the server changes the client password by replacing a digest of at least the old password with a digest of at least the new password.

2. A computer program product stored in a computer readable storage medium, comprising:
    first instructions whereby a client requests access to a server by sending a first set of values to the server, wherein the client and the server are connected by a network connection, wherein the client has a userid and a password associated with the client, and wherein the first set of values includes a client-generated random value, a large prime number, a primitive root of the large prime number, and the primitive root raised to a power of a large random integer less than the large prime number minus one;
    second instructions whereby the server responds to the client by generating a one-time challenge token that depends at least on a server-generated random value and sending the challenge token to the client, wherein the server generates the challenge token by exclusive-oring the server-generated random value with a first hash, and wherein the first hash is a hash of the primitive root of the large prime number raised to a power, a digest of the client's userid and password, and the client-generated random value;
    third instructions whereby the client retrieves the server-generated random value from the challenge token and sends the server-generated random value and the userid to the server;
    fourth instructions whereby the server verifies the received server-generated random value from the client is correct by comparing the server-generated random value received from the client with the server's stored value of the server-generated random number, and if so, the server generates a one-time authentication token and sends it to the client, giving it permission to access the server;
    fifth instructions whereby the client verifies the validity of the one-time authentication token received from the server;
    sixth instructions whereby if the client verifies that the one-time authentication token from the server is valid, the client changes the password by computing a hash of the userid and a new password to form a new digest, creating a mask, computing a message authentication code, and by exclusive-oring the mask with the new digest to form a result, and sending the result, the userid, and the message authentication code to the server;
    seventh instructions whereby the server retrieves the new digest by exclusive-oring the mask with the received result, and wherein the server verifies the received message authentication code; and
    eighth instructions whereby the server changes the client password by replacing a digest of at least the old password with a digest of at least the new password if the received message authentication code is verified.

* * * * *